S. E. ALLEY AND A. THOMSON.
COMBINED CRANK SHAFT AND DIFFERENTIAL GEAR.
APPLICATION FILED SEPT. 15, 1920.

1,381,781.

Patented June 14, 1921.
2 SHEETS—SHEET 1.

INVENTORS
STEPHEN E. ALLEY
ARTHUR THOMSON
BY
ATTORNEYS

S. E. ALLEY AND A. THOMSON.
COMBINED CRANK SHAFT AND DIFFERENTIAL GEAR.
APPLICATION FILED SEPT. 15, 1920.

1,381,781.

Patented June 14, 1921.
2 SHEETS—SHEET 2.

INVENTORS
STEPHEN E. ALLEY
ARTHUR THOMSON
BY
ATTORNEYS

UNITED STATES PATENT OFFICE.

STEPHEN EVANS ALLEY AND ARTHUR THOMSON, OF SHREWSBURY, ENGLAND.

COMBINED CRANK-SHAFT AND DIFFERENTIAL GEAR.

1,381,781. Specification of Letters Patent. Patented June 14, 1921.

Application filed September 15, 1920. Serial No. 410,528.

*To all whom it may concern:*

Be it known that we, STEPHEN EVANS ALLEY and ARTHUR THOMSON, subjects of the King of Great Britain and Ireland, and residents of Shrewsbury, in the county of Salop, England, have invented a certain new and useful Improved Combined Crank-Shaft and Differential Gear, of which the following is the specification.

The invention relates to crank-shafts with which are so combined trains of differential gearing that transmission members at the ends of the shaft are capable of transmitting differential motion, and has for its object to provide a simple, effective and easily constructed arrangement of such a kind that the bearings of the pinion shafts, crank shaft and end shafts are solidly supported.

According to the invention, the crank-shaft is of the type having two crank pins at right angles to one another. Its end shaft members are hollow, and within them are carried differential shafts each extending inward through the adjacent web of a crank and bearing close to the inner face of that crank web a pinion. The crank pins are hollow, and these primary pinions extend into gaps cut to receive them in the inner peripheral walls of the crank pins. Within the hollow crank pins are spindles having formed near their outer ends pinions which gear with the primary pinions through the gaps in the pin peripheries. Beyond the pinions, the spindles may have heads which fit within and serve as bearing surfaces and as closures to counterbores in the crank pins and webs in which the pinions lie.

The inner and adjacent ends of the two spindles extend toward one another beyond the respective inner crank webs and bear pinions which mesh with one another between the two cranks. At this point in the shaft, a third crank is formed at such an angle as to clear the intermeshing pinions. Alternatively, the two cranks may be made separate and bolted together.

Figure 1:
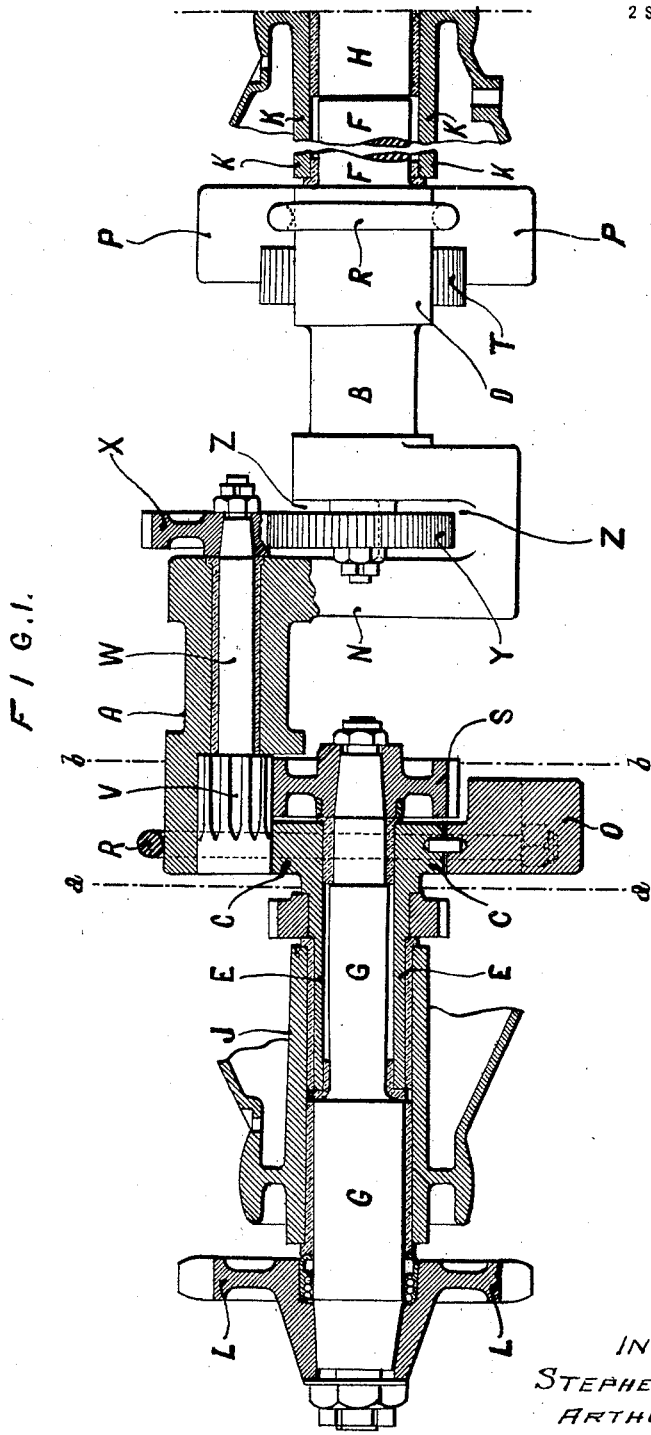
Figure 2:
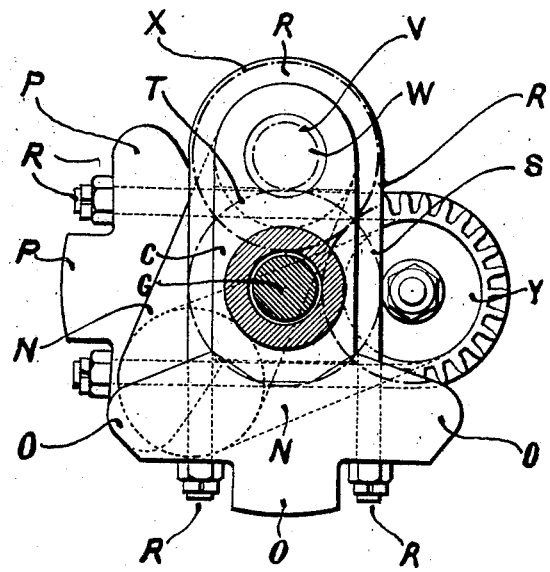
Figure 3:
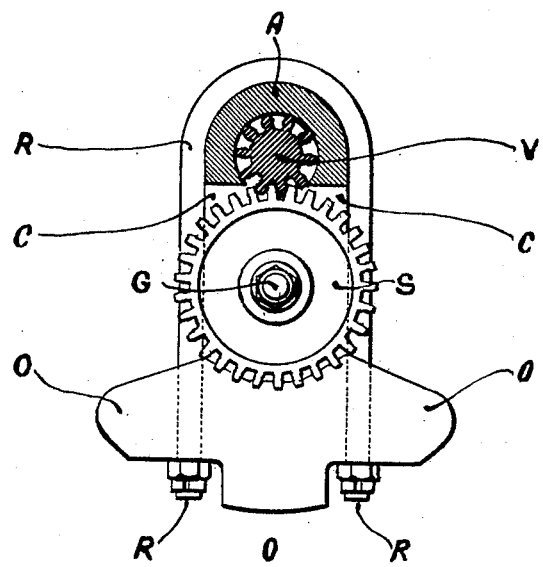

An example of a differential crank-shaft made according to the invention is shown on two accompanying sheets of drawings in which Figure 1, Sheet 1, is a longitudinal sectional elevation, Fig. 2, Sheet 2, a transverse sectional elevation on the line *a—a* of Fig. 1 looking to the right and Fig. 3, Sheet 2, a like view on the line *b—b* looking to the left.

In this example, the crank-pins A, B, at right angles to one another are carried on webs C, D, from end shaft members E, F. These end shaft members are hollow and within them are differential shafts G, H, extending out beyond the members E, F, supported along with those members in bearings J, K, and carrying at their outer ends sprocket wheels one L of which is shown. The adjacent ends of the crank pins A, B, are joined by a web member N, while there are applied to the webs C, D, balance weights O, P, supported by stirrups R.

The differential shafts G, H, extend inward through the crank webs C, D, and carry at their inner ends differential pinions S, T.

These pinions S, T, mesh through gaps cut in the inner peripheries of the crank pins A, B, with pinions V formed on shafts W lying within the hollow crank pins A, B. These shafts W extend toward one another and bear at their adjacent ends pinions X, Y, of such diameter that they mesh with one another, the intermediate web member N being formed with a gap Z to receive them.

What we claim is:—

1. A combined crank-shaft and differential gear having two crank pins at right angles and comprising hollow end-shaft members within which are differential shafts having on their inner ends, and within the crank webs, pinions meshing through gaps in the inner peripheries of the hollow crank pins with pinions formed on shafts lying within the pins and having at their inner ends intermeshing pinions accommodated in a gapped web member connecting the adjacent ends of the two crank pins.

2. In the crank-shaft and differential gear forming the subject-matter of claim 1 hereof, balance weights held upon the outer crank webs by stirrups, as set forth.

In testimony whereof we have signed our names to this specification.

STEPHEN EVANS ALLEY.
ARTHUR THOMSON.